United States Patent
Adler et al.

(10) Patent No.: US 8,725,615 B2
(45) Date of Patent: May 13, 2014

(54) SYSTEM AND METHOD FOR MONITORING ACCOUNTS WITH INSURANCE BENEFITS

(75) Inventors: Deborah J. Adler, New Hope, PA (US); Barry G. Skolnick, Belle Mead, NJ (US)

(73) Assignee: Bank of America Corporation, Charlotte, NC (US)

( * ) Notice: Subject to any disclaimer, the term of this patent is extended or adjusted under 35 U.S.C. 154(b) by 952 days.

(21) Appl. No.: 11/759,562

(22) Filed: Jun. 7, 2007

(65) Prior Publication Data
US 2008/0162373 A1 Jul. 3, 2008

Related U.S. Application Data

(60) Provisional application No. 60/882,781, filed on Dec. 29, 2006.

(51) Int. Cl.
*G06Q 40/00* (2012.01)

(52) U.S. Cl.
USPC .............................. 705/36 R; 705/4

(58) Field of Classification Search
CPC ................................ G06Q 40/08; G06Q 40/00
USPC .......................... 705/35–45, 1.1, 4
See application file for complete search history.

(56) References Cited

U.S. PATENT DOCUMENTS

| | | | | |
|---|---|---|---|---|
| 5,864,685 A * | 1/1999 | Hagan | | 705/35 |
| 5,933,815 A * | 8/1999 | Golden | | 705/36 R |
| 6,049,772 A | 4/2000 | Payne et al. | | 705/4 |
| 6,275,807 B1 * | 8/2001 | Schirripa | | 705/36 R |
| 6,343,272 B1 | 1/2002 | Payne et al. | | 705/4 |
| 6,360,210 B1 | 3/2002 | Wallman | | 705/36 |
| 6,963,852 B2 | 11/2005 | Koresko | | 705/35 |
| 7,080,032 B2 | 7/2006 | Abbs et al. | | 705/35 |
| 7,089,201 B1 | 8/2006 | Dellinger et al. | | 705/35 |
| 7,127,423 B2 | 10/2006 | Dunning et al. | | 705/36 |

(Continued)

FOREIGN PATENT DOCUMENTS

| | | | | |
|---|---|---|---|---|
| CA | 2 255 289 A1 | 7/1999 | | G06F 17/60 |
| WO | WO 98/41941 A1 | 9/1998 | | G06F 17/60 |

OTHER PUBLICATIONS

Panko, Ron, "New Products", Best's Review, 108.4, (Aug. 2007), p. 18.*

(Continued)

*Primary Examiner* — Mohammad Z Shaikh
(74) *Attorney, Agent, or Firm* — Michael A. Springs

(57) ABSTRACT

A method for providing an investment account comprises storing an account associated with an owner, wherein the account comprises a plurality of instruments. The account is associated with a current value based at least in part on the plurality of instruments and with a base amount that is periodically adjusted to be the greater of the current value or the base amount prior to the adjustment. The method continues by updating the account based at least in part on one or more trading orders associated with the owner. The method continues by receiving an initial request to withdraw funds from the account. In conjunction with receiving the initial request, the method continues by determining an allowance amount based at least in part on the base amount. The method continues by permitting the withdrawal of the allowance amount from the account. If the current value of the account falls to zero, the method concludes by initiating one or more annuity payments based at least in part on the allowance amount.

35 Claims, 7 Drawing Sheets

(56) References Cited

U.S. PATENT DOCUMENTS

| | | | |
|---|---|---|---|
| 7,376,608 B1* | 5/2008 | Dellinger et al. | 705/36 R |
| 7,398,241 B2* | 7/2008 | Fay et al. | 705/36 R |
| 7,457,776 B1* | 11/2008 | Caruso et al. | 705/36 R |
| 7,685,065 B2* | 3/2010 | Weiss et al. | 705/39 |
| 7,698,201 B2* | 4/2010 | Carlson et al. | 705/36 R |
| 8,010,388 B2* | 8/2011 | Joyce | 705/4 |
| 8,024,248 B2* | 9/2011 | Stiff et al. | 705/36 R |
| 8,095,398 B2* | 1/2012 | Dellinger et al. | 705/4 |
| 8,204,767 B2* | 6/2012 | Dellinger et al. | 705/4 |
| 8,209,197 B2* | 6/2012 | Tatro et al. | 705/4 |
| 8,234,132 B2* | 7/2012 | Kravitz et al. | 705/4 |
| 8,370,242 B2* | 2/2013 | Stiff et al. | 705/36 R |
| 8,412,545 B2* | 4/2013 | Stiff et al. | 705/4 |
| 8,447,636 B2* | 5/2013 | Tatro et al. | 705/4 |
| 8,566,191 B2* | 10/2013 | Shelon et al. | 705/35 |
| 2001/0014873 A1* | 8/2001 | Henderson et al. | 705/35 |
| 2002/0138386 A1* | 9/2002 | Maggioncalda et al. | 705/36 |
| 2002/0174042 A1* | 11/2002 | Arena et al. | 705/35 |
| 2002/0174046 A1 | 11/2002 | Mistretta | 705/36 |
| 2002/0184129 A1 | 12/2002 | Arena et al. | 705/35 |
| 2002/0194098 A1 | 12/2002 | Stiff et al. | 705/36 |
| 2002/0198801 A1 | 12/2002 | Dixon et al. | 705/35 |
| 2003/0083972 A1 | 5/2003 | Williams | 705/36 |
| 2003/0167221 A1 | 9/2003 | Kochansky | 705/36 |
| 2004/0078244 A1* | 4/2004 | Katcher | 705/4 |
| 2004/0088201 A1 | 5/2004 | Lang | 705/4 |
| 2004/0177022 A1 | 9/2004 | Williams et al. | 705/36 |
| 2004/0215493 A1 | 10/2004 | Koppes et al. | 705/4 |
| 2005/0086085 A1 | 4/2005 | Berlin et al. | 705/4 |
| 2005/0234821 A1 | 10/2005 | Benham et al. | 705/40 |
| 2005/0288969 A1 | 12/2005 | Schuver et al. | 705/4 |
| 2005/0289033 A1 | 12/2005 | Schuver et al. | 705/35 |
| 2005/0289049 A1 | 12/2005 | Schuver et al. | 705/40 |
| 2006/0041453 A1 | 2/2006 | Clark et al. | 705/4 |
| 2006/0085338 A1 | 4/2006 | Stiff et al. | 705/40 |
| 2006/0095353 A1 | 5/2006 | Midlam | 705/35 |
| 2006/0106698 A1 | 5/2006 | Mahaney et al. | 705/35 |
| 2006/0111997 A1 | 5/2006 | Abbott et al. | 705/35 |
| 2006/0116941 A1 | 6/2006 | Lombardo | 705/35 |
| 2006/0143114 A1 | 6/2006 | Schuver et al. | 705/38 |
| 2007/0011086 A1* | 1/2007 | Dellinger et al. | 705/38 |
| 2007/0027728 A1 | 2/2007 | Schuver et al. | 705/4 |
| 2008/0071661 A1* | 3/2008 | Jeudy et al. | 705/36 R |
| 2008/0082369 A1* | 4/2008 | Carlson et al. | 705/4 |
| 2008/0133280 A1* | 6/2008 | Ziegler | 705/4 |

OTHER PUBLICATIONS

Koco, Linda, "Fortis systematic withdrawal plan guarantees income", National Underwriter, Life, health/financial services ed. 103.40, Oct. 4, 1999, pp. 33,36.*

Drinkwater, Matthew, "Who Benefits From Living Benefits?", LIMRA's MarketFacts Quarterly, 24.2, (Spring 2005), pp. 66-69.*

Panko, Ron, "Money-Back Guarantee", Best's Review 105.1 (May 2004), pp. 77-82.*

Clements, Jonathan, "An Annuity That's Worth a Second Look: Retirement Security—But at a Price", Wall Street Journal, Eastern edition, New York, N.Y., Sep. 28, 2005, p. D.1.*

"An Annuity That's Worth a Second Look: Retirement Security—But at a Price" by Jonathan Clements, Staff Reporter of The Wall Street Journal; online at http://online.wsj.com/news/articles/SB112785617455153670, Sep. 28, 2005.

* cited by examiner

*FIG. 2A*

FSA — 12

Owner A
Birthdate: 10/2/1976
Age: 49

Today's Date: 8/7/2026

| Initial Deposit | |
|---|---|
| $100,000 | 12/2/2006 |

| Contributions | |
|---|---|
| $50,000 | 6/4/2008 |
| $50,000 | 8/2/2010 |
| $100,000 | 4/2/2014 |

↗ 78

| Current Value | |
|---|---|
| $753,500.00 | 8/7/2026 |

| Base Amount | |
|---|---|
| $712,002.00 | 12/2/2025 |

↙ 64

66 ↗

| Income Percentages | |
|---|---|
| Age | Percentage |
| 50 – 59 | 5.00% |
| 60 – 69 | 6.00% |
| 70 – 79 | 7.00% |
| 80 – 89 | 8.00% |

↖ 62

| Investment Instruments | | | |
|---|---|---|---|
| Instrument | Units | Unit Price | Asset Value |
| Security A | 6,000 | $36.00 | $216,000.00 |
| Security B | 3,500 | $67.00 | $234,500.00 |
| Security C | 5,000 | $27.00 | $135,000.00 |
| Security D | 4,000 | $42.00 | $168,000.00 |
| | | Total Value | $753,500.00 |

↗ 74

| Annuity Condition |
|---|
| If current value equals zero, activate annuity payments equal to product of identified Income Percentage multiplied by Base Amount |

FSA—12

Owner A
Birthdate: 10/2/1976
Age: 63

Today's Date: 8/7/2040

| Initial Deposit | |
|---|---|
| $100,000 | 12/2/2006 |

| Contributions | |
|---|---|
| $50,000 | 6/4/2008 |
| $50,000 | 8/2/2010 |
| $100,000 | 4/2/2014 |

78

| Current Value | |
|---|---|
| $1,285,432.00 | 8/7/2026 |

| Base Amount | |
|---|---|
| $1,250,465.00 | 12/2/2039 |

66

64

Income Percentages

| Age | Percentage |
|---|---|
| 50 - 59 | 5.00% |
| 60 - 69 | 6.00% |
| 70 - 79 | 7.00% |
| 80 - 89 | 8.00% |

62

Investment Instruments

| Instrument | Units | Unit Price | Asset Value |
|---|---|---|---|
| Security A | 5,000 | $36.00 | $180,000.00 |
| Security B | 4,325 | $67.00 | $289,775.00 |
| Security C | 7,230 | $27.00 | $195,210.00 |
| Security D | 6,500 | $42.00 | $273,000.00 |
| Security E | 4,500 | $55.00 | $247,500.00 |
| Security F | 2,221 | $45.00 | $99,947.00 |
| | | Total Value | $1,285,432.00 |

74

| Initial Withdrawel Date | 8/7/2040 |
|---|---|
| Age | 63 |
| Income Percentage | 6.00% |
| Allowance Amount | $75,027.90 |

72

| Annuity Condition | $25,000.00 |
|---|---|
| If current value equals zero, activate annuity payments equal to product of identified Income Percentage multiplied by Base Amount | |

FSA — 12

Owner A
Birthdate: 10/2/1976
Age: 78

Today's Date: 8/7/2055

| Initial Deposit | |
|---|---|
| $100,000 | 12/2/2006 |

| Contributions | |
|---|---|
| $50,000 | 6/4/2008 |
| $50,000 | 8/2/2010 |
| $100,000 | 4/2/2014 |

| Current Value | |
|---|---|
| $670,540.00 | 8/7/2055 |

| Base Amount | |
|---|---|
| $1,250,465.00 | 12/2/2054 |

Income Percentages

| Age | Percentage |
|---|---|
| 50 - 59 | 5.00% |
| 60 - 69 | 6.00% |
| 70 - 79 | 7.00% |
| 80 - 89 | 8.00% |

| Contract Year | Amount |
|---|---|
| 2040 | $75,027.90 |
| 2041 | $70,000.00 |
| 2042 | $75,027.90 |
| 2043 | $75,000.00 |
| 2044 | $75,027.90 |
| 2045 | $65,000.00 |
| 2046 | $75,027.90 |
| 2047 | $65,000.00 |
| 2048 | $75,027.90 |
| 2049 | $75,027.90 |
| 2050 | $75,027.90 |
| 2051 | $75,027.90 |
| 2052 | $75,027.90 |
| 2053 | $75,027.90 |
| 2054 | $75,027.90 |
| 2055 | $65,000.00 |

| Initial Withdrawel Date | 8/7/2040 | $25,000.00 |
|---|---|---|
| Age | 63 | |
| Income Percentage | 6.00% | |
| Allowance Amount | $75,027.90 | |

Investment Instruments

| Instrument | Units | Unit Price | Asset Value |
|---|---|---|---|
| Security A | 4,000 | $33.00 | $132,000.00 |
| Security B | 2,000 | $68.00 | $136,000.00 |
| Security E | 4,500 | $51.00 | $229,500.00 |
| Security F | 3,845 | $45.00 | $173,040.00 |
| | | Total Value | $670,540.00 |

Annuity Condition

If current value equals zero, activate annuity payments equal to product of identified Income Percentage multiplied by Base Amount

FIG. 2D

FSA—12

Owner A
Birthdate: 10/2/1976
Age: 89

Today's Date: 8/7/2066

| Initial Deposit | |
|---|---|
| $100,000 | 12/2/2006 |

| Contributions | |
|---|---|
| $50,000 | 6/4/2008 |
| $50,000 | 8/2/2010 |
| $100,000 | 4/2/2014 |

78

| Current Value | |
|---|---|
| $0.00 | 8/7/2066 |

| Base Amount | |
|---|---|
| $1,250,465.00 | 12/2/2065 |

66

64

62

Income Percentages

| Age | Percentage |
|---|---|
| 50 - 59 | 5.00% |
| 60 - 69 | 6.00% |
| 70 - 79 | 7.00% |
| 80 - 89 | 8.00% |

| Initial Withdrawel Date | 8/7/2040 | $25,000.00 |
|---|---|---|
| Age | 63 | |
| Income Percentage | 6.00% | |
| Allowance Amount | $75,027.90 | |

72

Investment Instruments

| Instrument | Units | Unit Price | Asset Value |
|---|---|---|---|
| | | Total Value | $0.00 |

74

Annuity Condition

If current value equals zero, activate annuity payments equal to product of identified Income Percentage multiplied by Base Amount

58

76

| Contract Year | Amount | Annuity |
|---|---|---|
| 2040 | $75,027.90 | n/a |
| 2041 | $70,000.00 | n/a |
| 2042 | $75,027.90 | n/a |
| 2043 | $75,027.90 | n/a |
| 2044 | $75,000.00 | n/a |
| 2045 | $75,027.90 | n/a |
| 2046 | $65,000.00 | n/a |
| 2047 | $75,027.90 | n/a |
| 2048 | $65,000.00 | n/a |
| 2049 | $75,027.90 | n/a |
| 2050 | $75,027.90 | n/a |
| 2051 | $75,027.90 | n/a |
| 2052 | $75,027.90 | n/a |
| 2053 | $75,027.90 | n/a |
| 2054 | $75,027.90 | n/a |
| 2055 | $65,000.00 | n/a |
| 2056 | $75,027.90 | n/a |
| 2057 | $75,027.90 | n/a |
| 2058 | $75,027.90 | n/a |
| 2059 | $75,027.90 | n/a |
| 2060 | $75,027.90 | n/a |
| 2061 | $75,027.90 | n/a |
| 2062 | $75,027.90 | n/a |
| 2063 | $75,027.90 | n/a |
| 2064 | $75,027.90 | n/a |
| 2065 | $24,625.00 | $50,402.90 |
| 2066 | n/a | $75,027.90 |

16

38

SYSTEM AND METHOD FOR MONITORING ACCOUNTS WITH INSURANCE BENEFITS

RELATED APPLICATION

This patent application claims priority to Patent Application Ser. No. 60/882,781, filed Dec. 29, 2006, entitled: System and Method for Monitoring Accounts with Insurance Benefits.

TECHNICAL FIELD OF THE INVENTION

The present invention relates generally to electronic investing systems and more specifically to a system and method for monitoring accounts with insurance benefits.

BACKGROUND OF THE INVENTION

Traditional investing systems allow individuals to select and purchase securities. However, when investing for retirement, an investor faces a risk that the securities purchased will decrease in value due to negative market conditions. In addition, once the investor begins drawing on the account assets during retirement, the investor faces a risk that he or she will outlive his or her accumulated wealth.

SUMMARY OF THE INVENTION

In accordance with the present invention, the disadvantages and problems associated with prior investing systems have been substantially reduced or eliminated.

In some embodiments, a method for providing an investment account comprises storing an account associated with an owner, wherein the account comprises a plurality of instruments. The account is associated with a current value based at least in part on the plurality of instruments and with a base amount that is periodically adjusted to be the greater of the current value or the base amount prior to the adjustment. The method continues by updating the account based at least in part on one or more trading orders associated with the owner. The method continues by receiving an initial request to withdraw funds from the account. In conjunction with receiving the initial request, the method continues by determining an allowance amount based at least in part on the base amount. The method continues by permitting the withdrawal of the allowance amount from the account. In some embodiments, the current value of the account may decrease due to investment performance and/or withdrawals from the account. If the current value of the account falls to zero, the method concludes by initiating one or more annuity payments based at least in part on the allowance amount. The one or more annuity payments may continue until the death of the owner of the account. According to certain embodiments, each annuity payment may be equal to the allowance amount.

In other embodiments, a method for managing a plurality of investment accounts comprises storing an account associated with an owner. The account has a current value, comprises a plurality of instruments, and is associated with an annuity benefit that is triggered if the current value of the account falls to zero. The method continues by updating the account based at least in part on one or more trading orders associated with the owner. The method continues by monitoring the account to determine whether the plurality of instruments in the account satisfy one or more investment guidelines. If the account does not satisfy the one or more investment guidelines, the method concludes by transmitting an alert message to a client device associated with the owner.

The invention has several important technical advantages. Various embodiments of the invention may have none, some, or all of these advantages. One advantage is that the present invention provides an investment account that (1) is based on investment instruments selected by the investor and (2) is associated with an annuity that is triggered if the value of the investment account falls below a configurable threshold. Another advantage is that the present invention allows an insurer associated with the annuity to monitor the investment account based on real-time account data and to determine whether the investment account satisfies prescribed investment guidelines. Other advantages of the present invention will be readily apparent to one skilled in the art from the description and the appended claims.

BRIEF DESCRIPTION OF THE DRAWINGS

For a more complete understanding of the present invention and its advantages reference is now made to the following description taken in conjunction with the accompanying drawings in which:

FIGS. 2A-2D illustrate examples of financial services account profiles according to certain embodiments of the present invention;

DETAILED DESCRIPTION OF THE INVENTION

Figure 1:
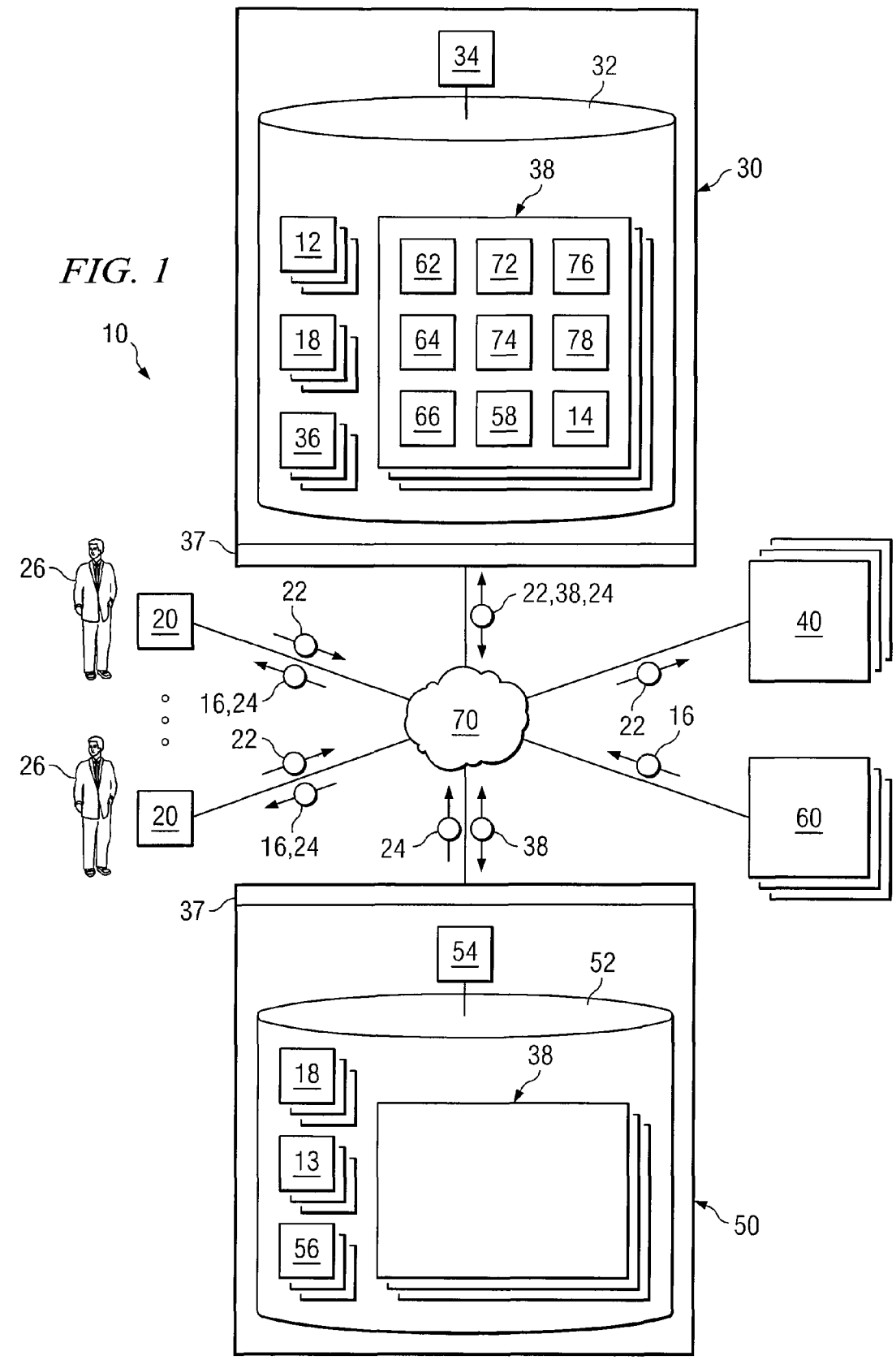
FIG. 1 illustrates an investment system according to certain embodiments of the present invention.

FIG. 1 illustrates one embodiment of investment system 10. Investment system 10 is generally operable to create and manage Financial Services Accounts (FSAs) 12. FSA 12 generally represents an investment in a plurality of investment instruments 14. In some embodiments, FSA 12 is associated with an annuity 13 that may be triggered to provide annuity payments 16 if the value of FSA 12 falls below a configurable threshold. As a result, FSA 12 may provide an income stream that is guaranteed regardless of the performance of the investment instruments 14 underlying FSA 12. To control risk associated with FSAs 12, investment system 10 may monitor FSAs 12 to verify that they satisfy prescribed investment guidelines 18. Investment system 10 generally comprises clients 20, account server 30, market centers 40, monitor server 50, and insurance centers 60 that are communicatively coupled via network 70.

Investment system 10 comprises a plurality of clients 20. A particular client 20 is generally operable to transmit information, deposits, fees, and/or trading orders 22 to account server 30 via network 70. Client 20 is further operable to receive withdrawals, annuity payments 16, trade confirmations, investment guidelines 18, alert messages 24, and/or other suitable information from account server 30, monitor server 50, market centers 40, and/or insurance centers 60. In some embodiments, client 20 represents any suitable local or remote end-user device that may be used by owners 26 to access one or more elements of investment system 10, such as account server 30. A particular client 20 may comprise a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of investment system 10. Client 20 may comprise any suitable user interface such as a display, microphone, keyboard, or any other appropriate terminal equipment according to particular configurations and arrangements. It will be understood that there may be any number of clients 20 communicatively coupled to the various components of system 10.

In some embodiments, a particular client 20 may be associated with a particular owner 26. Owner 26 may represent an individual that has a complete or partial ownership interest in one or more FSAs 12 in investment system 10. The term "owner" is meant to broadly apply to any entity that has an ownership interest in FSA 12, whether that entity is an individual, a broker, an agent acting on behalf of a principal, a legal entity (such as a corporation), or any machine or mechanism that is capable of managing FSA 12 in investment system 10. It should be understood that FSA 12 may be associated with a non-natural owner 26 such as, for example, a trust. In some embodiments, when FSA 12 is owned by a trust, a particular individual may be designated as a beneficiary of FSA 12. The beneficiary of FSA 12 may be referred to as a beneficial owner 26 of FSA 12.

As explained above, FSA 12 may comprise a plurality of investment instruments 14 and may be associated with annuity 13 that is triggered if the value of FSA 12 falls below a configurable threshold. In some embodiments, an advantage of annuity 13 is that FSA 12 may provide owner 26 with an income stream that is guaranteed regardless of the performance of the investment instruments 14 underlying FSA 12. Owner 26 may use client 20 to establish FSA 12 in investment system 10. To establish FSA 12, owner 26 may, according to some embodiments, use client 20 to transmit an initial deposit to account server 30. In other embodiments, owner 26 may establish FSA 12 based upon existing assets of owner 26. In particular, owner 26 may use client 20 to designate investment instruments 14 that are currently owned by owner 26 and that owner 26 wishes to include in FSA 12. After establishing FSA 12, owner 26 may use client 20 to submit trading orders 22 to account server 30 and/or market center 40. By submitting trading orders 22, owner 26 of a particular FSA 12 may select and manage investment instruments 14 underlying the particular FSA 12.

Trading orders 22 may comprise orders to trade investment instruments 14. Investment instruments 14 may comprise stocks, bonds, futures contracts, equity securities, mutual funds, managed accounts, options, derivatives, commodities, currencies, financial instruments, or any number and combination of suitable instruments. In particular embodiments, trading order 22 may specify a target price for the instrument 14. Trading orders 22 may comprise bids, offers, market orders, limit orders, stop loss orders, day orders, open orders, GTC ("good till cancelled") orders, "good through" orders, "all or none" orders, "any part" orders, or any other suitable order for trading.

Clients 20 may be communicatively coupled via network 70 to account server 30. Account server 30 is generally operable to create and manage FSAs 12 for a plurality of owners 26 in investment system 10. Account server 30 is operable to receive deposits, fees, and trading orders 22 from clients 20. Account server 30 is operable to transmit trading orders 22 to market centers 40 and to receive from market centers 40 market data and/or confirmations of executed trades. Account server 30 is further operable to determine whether a particular FSA 12 satisfies a condition for triggering annuity payments 16 to owner 26 of the particular FSA 12. In some embodiments, account server 30 may be associated with and maintained by a bank, brokerage firm, and/or other suitable account management entity. Account server 30 may comprise any suitable combination of hardware and/or software implemented in one or more modules to provide the described functions and operations. In some embodiments, account server 30 may comprise a general-purpose personal computer (PC), a Macintosh, a workstation, a Unix-based computer, a server computer, or any suitable processing device. Account server 30 may comprise account memory 32 and account processor 34.

Account memory 32 is generally operable to store account logic 36 and FSA profiles 38. Account logic 36 comprises rules, algorithms, code, tables, and/or other suitable instructions for generating and managing a plurality of FSAs 12. When executed by account processor 34, account logic 36 is operable to route trading orders 22, receive contributions to FSAs 12, process withdrawals from FSAs 12, determine the value of a particular FSA 12, and otherwise manage FSAs 12 in investment system 10.

A particular FSA profile 38 in account memory 32 generally comprises information or data regarding a corresponding FSA 12 in investment system 10. In some embodiments, when owner 26 uses client 20 to establish a particular FSA 12, account processor 34 generates a corresponding FSA profile 38. FSA profile 38 for a particular FSA 12 generally comprises information regarding owner 26 (e.g., information regarding the person(s), trust(s), corporation(s), and/or other suitable legal entity that constitute owner 26) as well as information regarding the quantity and value of investment instruments 14 underlying the particular FSA 12. Account processor 34 is operable to update FSA profiles 38 in real-time or near real-time in response to trading orders 22, contributions, withdrawals, and other account activity. In some embodiments, account memory 32 may comprise a respective FSA profile 38 for each FSA 12 established in investment system 10.

Account memory 32 may be communicatively coupled to account processor 34. Account processor 34 is generally operable to execute account logic 36 stored in account memory 32 to perform the described functions and operations. Account processor 34 may comprise any suitable combination of hardware and/or software implemented in one or more modules to provide the described function or operation.

In some embodiments, account server 30 may comprise an interface 37. Interface 37 may be communicatively coupled to account processor 34 and to network 70. Interface 37 may comprise a network portal, socket, listener module, and/or any combination of hardware and/or software suitable to facilitate communication of data between account server 30 and other components of investment system 10.

Account server 30 may be communicatively coupled via network 70 to one or more market centers 40. Market centers 40 are generally operable to receive and execute trading orders 22 for investment instruments 14 underlying FSAs 12 in investment system 10. Once a particular trading order 22 is executed, market center 40 is operable to generate and transmit a trade confirmation message to clients 20 and/or account server 30. Market centers 40 may comprise all manner of order execution venues including exchanges, Electronic Communication Networks (ECNs), Alternative Trading Systems (ATSs), market makers, or any other suitable market participants. Each market center 40 may maintain a bid and offer price for at least one investment instrument 14 by standing ready, willing, and able to buy or sell that investment instrument 14 at publicly quoted prices, also referred to as market center prices. Different market centers 40 may provide different market center prices for particular investment instruments 14. For example, a particular market center 40 may offer a particular bid price and/or offer price for a particular investment instrument 14, while another market center 40 may offer a different bid price and/or offer price for the same investment instrument 14.

As explained above, to control risk associated with FSAs 12, investment system 10 may monitor FSAs 12 to verify that they satisfy prescribed investment guidelines 18. In particular, investment system 10 may comprise monitor server 50. Monitor server 50 is generally operable to receive from account server 30 some or all of the data regarding FSA profiles 38 in account memory 32. According to certain embodiments, monitor server 50 may receive data from account server 30 in real-time or substantially real-time. In some embodiments, monitor server 50 is operable to categorize investment instruments 14 in FSA profiles 38 according to configurable instrument classifications. Monitor server 50 is operable to analyze data in a particular FSA profile 38 and determine whether FSA 12 associated with the particular FSA profile 38 satisfies investment guidelines 18. In some embodiments, monitor server 50 is operable to check and analyze investment instruments 14 in FSA profile 38 associated with a particular FSA 12 in response to any suitable event such as, for example, the execution of a trading order 22 associated with FSA 12, the transfer of cash and/or investment instruments 14 associated with FSA 12, the expiration of a configurable time interval, and/or any suitable event. If a particular FSA 12 is not in compliance with investment guidelines 18, monitor server 50 may generate and transmit an alert message 24 to account server 30 and/or client 20 associated with owner 26 of the particular FSA 12. In some embodiments, monitor server 50 may be associated with and maintained by an insurer, underwriter, and/or other suitable insurance entity. In certain embodiments, monitor server 50 may be operated by the same entity or by an affiliate or division of the entity that maintains and/or operates account server 30. Monitor server 50 may comprise any suitable combination of hardware and/or software implemented in one or more modules to provide the described functions and operations. In some embodiments, monitor server 50 may comprise a general-purpose personal computer (PC), a Macintosh, a workstation, a Unix-based computer, a server computer, or any suitable processing device. Monitor server 50 may comprise monitor memory 52 and monitor processor 54.

Monitor memory 52 is generally operable to store monitor logic 56, investment guidelines 18, and some or all of the data in FSA profiles 38. Monitor logic 56 comprises rules, algorithms, code, tables, and/or other suitable instructions for determining compliance of FSA 12 with investment guidelines 18. When executed by monitor processor 54, monitor logic 56 is operable to categorize investment instruments 14 in FSA profiles 38, determine whether FSA 12 satisfies investment guidelines 18, and generate alert messages 24 and other messages regarding compliance of FSAs 12 with investment guidelines 18.

Investment guidelines 18 generally comprise rules, standards, policies, limitations, and/or any number and combination of suitable guidelines regarding the purchasing, selling, trading, and/or managing of investment instruments 14. In some embodiments, investment guidelines 18 may be designed to control the risk of an insurance entity associated with the annuity obligation of FSA 12. For example, investment guidelines 18 may require that investment instruments 14 in a particular FSA 12 meet a certain asset allocation and/or satisfy configurable quality thresholds. In some embodiments, investment guidelines 18 may provide thresholds for one or more categories of investment instruments 14. For example, investment guidelines 18 may specify that a particular category or categories of investment instruments 14 may not make up more or less than a configurable percentage of FSA 12. As another example, investment guidelines 18 may specify that, for a particular FSA 12, the ratio of a first category of investment instrument 14 to a second category of investment instrument 14 must be within a configurable range. According to certain embodiments, investment guidelines 18 may specify concentration criteria for investment instruments 14 in FSA 12. For example, investment guidelines 18 may specify that the number of different investment instruments 14 in FSA 12 must be more or less than a configurable threshold. In some embodiments, investment guidelines 18 may be configured to optimize the risk/reward tradeoff of an insurance entity associated with FSA 12. It should be understood that investment guidelines 18 may comprise any number and combination of thresholds, rules, standards, limitations, or other suitable guidelines regarding the purchase, sale, ownership, or management of investment instruments 14.

Monitor memory 52 may be communicatively coupled to monitor processor 54. Monitor processor 54 is generally operable to execute monitor logic 56 stored in monitor memory 52 to perform the described functions and operations. Monitor processor 54 may comprise any suitable combination of hardware and/or software implemented in one or more modules to provide the described function or operation.

Monitor server 50 may be communicatively coupled to one or more insurance centers 60 via network 70. Insurance center 60 is generally operable to provide a guarantee of a benefit or annuity 13 associated with FSA 12. In some embodiments, when a configurable condition associated with FSA 12 is satisfied, an obligation of insurance center 60 may be triggered to provide annuity payments 16 to owner 26 of FSA 12. This configurable condition associated with FSA 12 may be referred to as annuity condition 58. For example, annuity condition 58 may specify that, when the value of FSA 12 falls to zero, insurance center 60 should initiate annuity payments 16 to owner 26 of FSA 12. Insurance center 60 may represent any suitable insurance company, underwriter, or other entity suitable to provide annuity payments 16 associated with FSA 12. Insurance center 60 may configure investment guidelines 18 stored in monitor memory 52 such that the risk/reward of insurance center 60 is managed within acceptable tolerances. According to certain embodiments, insurance center 60 maintains and operates monitor server 50 to verify compliance of FSAs 12 with investment guidelines 18.

In some embodiments, network 70 may comprise a communication platform operable to exchange data or information between clients 20, account server 30, market centers 40, monitor server 50, and/or insurance centers 60. Network 70 may provide various components of investment system 10 with the ability to communicate trading orders 22, alert messages 24, deposits, withdrawals, data regarding FSA profiles 38, and/or other suitable information. According to certain embodiments, network 70 comprises a plain old telephone system (POTS), a cellular system, a satellite system, or any suitable combination of wireline and/or wireless systems. Network 70 may further comprise any combination of the above examples and any local area network (LAN), metropolitan area network (MAN), wide area network (WAN), wireless local area network (WLAN), virtual private network (VPN), Internet, intranet, or any other appropriate architecture or system that facilitates communications between the various components of investment system 10.

In operation, investment system 10 is operable to establish and manage FSAs 12. To establish FSA 12, a particular owner 26 may use client 20 to submit to account server 30 a request to open FSA 12. Upon receiving the request from client 20, account server 30 may transmit to client 20 a request for owner data. Owner data may comprise biographical information such as, for example, the identity, age, employer, gender, marital status, and contact information of owner 26; financial information such as, for example, the annual income and/or retirement goals of owner 26; medical information of owner 26; initial FSA deposit amount; and/or any other suitable information.

Upon receiving the requested owner data, account server 30 may determine one or more income percentages 62 associated with FSA 12. A particular income percentage 62 represents a percentage of FSA 12 that owner 26 may be permitted to withdraw from FSA 12 during a configurable period of time. For example, account server 30 may determine that, if owner 26 makes an initial withdrawal from FSA 12 between the ages of 50 and 59, then owner 26 will be permitted, for the rest of his or her life, to annually withdraw up to 5.0% of base amount 64 associated with FSA 12. Account server 30 may further determine that, if owner 26 waits until he or she is between ages 60 and 69 to make an initial withdrawal, then owner 26 will be permitted, for the rest of his or her life, to annually withdraw up to 6.0% of a base amount 64 associated with FSA 12. In the foregoing example, account server 30 determined income percentages 62 of 5.0% and 6.0% associated with respective age ranges. It should be understood, however, that account server 30 may determine any suitable number and combination of income percentages 62 associated with any suitable number and combination of age ranges. Account server 30 may determine income percentages 62 based on any suitable criteria such as, for example, life expectancy tables, current market data, current age of the particular owner 26, historical market data, the initial deposit amount, a health evaluation of the particular owner 26, a lifestyle evaluation of the particular owner 26, actuarial data, and any number and combination of suitable factors. In some embodiments, the particular scale of income percentages 62 determined at the time of opening FSA 12 will remain in effect and unchanged for the duration of the life of the particular owner 26. In some embodiments, the particular scale of income percentages 62 for FSA 12 of a first owner 26 may be the same as or different from the particular scale of income percentages 62 for FSA 12 of a second owner 26. In some embodiments, income percentages 62 may be referred to as "Lifetime Income Percentages."

After determining income percentages 62, account server 30 transmits income percentages 62 to client 20. In addition, or alternatively, account server 30 and/or monitor server 50 may transmit to client 20 investment guidelines 18. Investment guidelines 18 may comprise any suitable rules, standards, policies, limitations, and/or guidelines regarding the purchasing, selling, trading, and/or managing of investment instruments 14 underlying FSA 12.

After client 20 receives income percentages 62 and investment guidelines 18, owner 26 may use client 20 to transmit to account server 30 a message indicating his or her acceptance of income percentages 62 and/or investment guidelines 18. In some embodiments, owner 26 may then use client 20 to submit to account server 30 an initial deposit for FSA 12. Alternatively, or in addition, owner 26 may use client 20 to designate investment instruments 14 that are currently owned by owner 26 and that owner 26 wishes to include in FSA 12. Upon receiving the initial deposit and/or designation of investment instruments 14, account processor 34 may generate and store in account memory 32 a particular FSA profile 38 associated with the particular owner 26. In FSA profile 38, account processor 34 may store the received owner data, the determined income percentages 62 and corresponding age ranges, investment guidelines 18, information regarding investment instruments 14, and/or the initial deposit amount.

Upon generating account profile, account server 30 may designate the initial deposit amount as the base amount 64 of FSA 12. In some embodiments, base amount 64 generally represents a value that is used, in conjunction with a particular income percentage 62, to determine the maximum amount that owner 26 is permitted to withdraw from FSA 12 during a configurable period of time. Account server 30 may be configured to occasionally re-calculate base amount 64 of FSA 12. For example, account server 30 may be configured to re-calculate base amount 64 on an annual basis such as, for example, on the anniversary of the creation of the particular FSA 12. As another example, account server 30 may be configured to re-calculate base amount 64 in the event of the death of a spouse or a change in ownership of FSA 12. In some embodiments, account server 30 may be configured to re-calculate the base amount 64 to be equal to the greater of (1) the current value 66 of FSA 12 or (2) the prior base amount 64. Thus, in some embodiments, account server 30 may be configured to occasionally increase base amount 64 but to not decrease base amount 64. According to certain embodiments, base amount 64 may be referred to as the "Guaranteed Base."

After establishing FSA 12, owner 26 may use client 20 to transmit to account server 30 one or more trading orders 22 for one or more investment instruments 14. Account server 30 is operable to route the received trading orders 22 to one or more market centers 40. Account server 30 may use all or a portion of the initial deposit or assets in FSA 12 to fill the received trading orders 22. By allowing owner 26 to submit trading orders 22 to account server 30, investment system 10 may allow owner 26 to select the particular investment instruments 14 that underlie FSA 12. In some embodiments, because FSA 12 is associated with a future annuity 13, owner 26 is guaranteed a future income stream as long as owner 26 selects investment instruments 14 in such a way that FSA 12 complies with investment guidelines 18.

After submitting to account server 30 the initial deposit, owner 26 may use client 20 to make further contributions to FSA 12. Upon receiving additional contributions from owner 26, account server 30 may update FSA profile 38 associated with owner 26. Owner 26 may use the additional contributions to FSA 12 to execute trades for additional investment instruments 14. In some embodiments, account server 30 may be configured to allow contributions to FSA 12 before and after owner 26 makes an initial withdrawal from FSA 12. In other embodiments, account server 30 may be configured to allow contributions to FSA 12 prior to the initial withdrawal and to disallow contributions to FSA 12 after the first withdrawal.

As explained above, a particular FSA 12 has base amount 64. In addition, or alternatively, a particular FSA 12 has a current value 66. Current value 66 of a particular FSA 12 represents the total value of investment instruments 14 and/or other assets underlying the particular FSA 12. Current value 66 of a particular FSA 12 may be determined based on current market data from market centers 40. In some embodiments, account server 30 may be configured to update current value 66 of FSA 12 hourly, daily, or according to any suitable period of time. According to certain embodiments, owner contributions and/or positive market conditions may cause current value 66 of FSA 12 to increase. Withdrawals and/or negative market conditions may cause current value 66 of FSA 12 to decrease. As explained above, base amount 64 of FSA 12 may be based at least in part on current value 66 of FSA 12. As an example, account server 30 may be configured to re-calculate base amount 64 of FSA 12 annually by setting base amount 64 equal to the greater of (1) current value 66 of FSA 12 or (2) the prior year's base amount 64. Thus, in some embodiments, account server 30 may be configured to occasionally increase base amount 64 due to an increase in current value 66 but to not decrease base amount 64 due to a decrease in current value 66.

An example illustrates certain embodiments. Assume that account server 30 is configured to re-calculate base amount 64 once each year (e.g., on the anniversary date of the creation of FSA 12) by setting base amount 64 equal to the greater of (1) current value 66 of FSA 12 or (2) the prior year's base amount 64. In this example, if base amount 64 was determined to be $500,000 on a particular anniversary date and, due to investment performance and/or owner contributions, the current value 66 of FSA 12 increased to $550,000 by the subsequent anniversary date, then account server 30 may re-calculate base amount 64 to be $550,000 as of the subsequent anniversary date. Conversely, if base amount 64 was determined to be $500,000 on a particular anniversary date and, due to poor investment performance and/or withdrawals, the current value 66 of FSA 12 decreased to $450,000 by the subsequent anniversary date, account server 30 may allow base amount 64 to remain equal to $500,000 (i.e., the prior year's base amount 64). Thus, in some embodiments, although base amount 64 may increase from year to year due to positive investment performance and/or owner contributions, the base amount 64 will not decrease below the prior year's level.

In some embodiments, if the investment performance during a given year is less than a configurable threshold, then on the anniversary date, account server 30 may be configured to increase base amount 64 of FSA 12 by a configurable percentage. This configurable percentage may be referred to as the "rollup percentage." In such embodiments, account server 30 may be configured to re-calculate base amount 64 of FSA 12 annually by setting base amount 64 equal to the greater of (1) current value 66 of FSA 12 or (2) the product of the prior year's base amount 64 increased by the rollup percentage.

An example illustrates certain embodiments. Assume that account server 30 is configured to re-calculate base amount 64 once each year (e.g., on the anniversary date of the creation of FSA 12) by setting base amount 64 equal to the greater of (1) current value 66 of FSA 12 or (2) the product of the prior year's base amount 64 increased by a rollup percentage of 5%. In this example, if base amount 64 was determined to be $100,000 on a particular anniversary date and, due to investment performance, the current value 66 of FSA 12 increased to $110,000 by the subsequent anniversary date (i.e., increase of 10%), then account server 30 may re-calculate base amount 64 to be $110,000 as of the subsequent anniversary date. Conversely, if base amount 64 was determined to be $100,000 on a particular anniversary date and, due to lackluster investment performance, the current value 66 of FSA 12 increased to $103,000 by the subsequent anniversary date (i.e., increase of 3%), then account server 30 may re-calculate base amount 64 to be $105,000 as of the subsequent anniversary date (i.e., the product of $100,000 increased by the rollup percentage of 5%). Thus, if the investment performance during a given year is less than the rollup percentage, then on the anniversary date account server 30 may be configured to re-calculate base amount 64 by increasing the prior year's base amount 64 by the rollup percentage. In some embodiments, the rollup percentage may serve as an incentive for owner 26 to delay making an initial withdrawal from FSA 12.

In certain embodiments, to adjust base amount 64 of FSA 12, account server 30 may be configured to apply the rollup percentage independently of determining the change in current value 66 due to market performance. For example, assume that the rollup percentage is 5% and that base amount 64 on a first anniversary date is $100,000. By the second anniversary date, market performance has caused current value 66 of FSA 12 to increase by 8% to $108,000. In this example, account server 30 determines that, for the second anniversary date, the rollup percentage would have yielded a value of $105,000 (i.e., $100,000 increased by 5%). Because $108,000 is the higher value, account server 30, on the second anniversary date, sets base amount 64 of FSA 12 to be $108,000. In this example, by the third anniversary date, market performance has caused current value 66 of FSA 12 to increase by 3% to $111,240. Account server 30 determines that, for the third anniversary date, the rollup percentage would have yielded a value of $110,250 (i.e., the prior year's rollup value of $105,000 increased by the rollup percentage of 5%). Because $111,240 is the higher value, account server 30, on the third anniversary date, sets base amount 64 of FSA 12 to be $111,240. In this example, by the fourth anniversary date, market performance has caused current value 66 of FSA 12 to increase by 2% to $113,464.80. Account server 30 determines that, for the fourth anniversary date, the rollup percentage would have yielded a value of $115,762.50 (i.e., the prior year's rollup value of $110,250 increased by the rollup percentage of 5%). Because $115,762.50 is the higher value, account server 30, on the fourth anniversary date, sets base amount 64 of FSA 12 to be $115,762.50.

Although the foregoing example illustrates a rollup percentage of 5%, it should be understood that any suitable rollup percentage may be used. In the foregoing example, account server 30 adjusts base amount 64 of FSA 12 on an annual basis. It should be understood, however, that account server 30 may be configured to adjust base amount 64 quarterly, semi-annually, bi-annually, and/or according to any suitable interval of time.

In certain embodiments, prior to making an initial withdrawal from FSA 12, owner 26 may make contributions to FSA 12 and may submit trading orders 22 to manage the particular investment instruments 14 underlying FSA 12. As owner 26 trades investment instruments 14 and makes contributions, account server 30 may update FSA profile 38 in account memory 32 to reflect the current status of FSA 12. In particular, account server 30 may record in FSA profile 38 the particular investment instruments 14 currently held in FSA 12, current value 66 of FSA 12, base amount 64 of FSA 12, and/or any other suitable information. Because FSA 12 is associated with a guaranteed income stream, insurance center 60 may use monitor server 50 to continuously monitor FSA profiles 38 to verify whether particular investment instruments 14 held in FSAs 12 satisfy investment guidelines 18 stored in monitor memory 52.

In some embodiments, if trading order(s) 22 submitted by owner 26 result in a net decrease of assets from FSA 12, then account server 30 may record the net decrease as a withdrawal from FSA 12. As explained below, account server 30 may impose certain consequences if the withdrawals from FSA 12 exceed a configurable threshold during a configurable period of time.

In conjunction with monitoring FSA profiles 38, monitor server 50 may perform any suitable analysis of some or all of the data in FSA profiles 38 to determine whether FSAs 12 satisfy investment guidelines 18. For example, if investment guidelines 18 prescribe a threshold for the quantity of particular investment instrument(s) 14 in FSA 12, monitor server 50 may use data in FSA profile 38 to calculate the quantity of the particular investment instrument(s) 14 in FSA 12. Monitor server 50 may then compare the calculated quantity associated with FSA 12 against the prescribed threshold in investment guidelines 18. As another example, if investment guidelines 18 prescribe a threshold for the average price of particular investment instrument(s) 14 in FSA 12, monitor server 50 may use data in FSA profile 38 to calculate the average price of the particular investment instrument(s) 14 in FSA 12. Although the foregoing examples illustrate quantity and price thresholds, it should be understood that investment guidelines 18 may specify percentages, price ranges, quantity ranges, quality ratings, allocation criteria, and/or any suitable number and combination of metrics. Accordingly, to determine whether a particular FSA 12 complies with investment guidelines 18, monitor server 50 may use data in FSA profile 38 associated with the particular FSA 12 to calculate one or more percentages, quality ratings, prices, quantities, and/or any suitable number and combination of metrics.

In some embodiments, one or more investment guidelines 18 may be associated with a particular class of investment instrument 14. Accordingly, for a particular FSA profile 38, monitor server 50 may categorize the underlying investment instruments 14 into prescribed asset classifications. The prescribed asset classifications may comprise bonds, equities, futures, domestic investments, foreign investments, commodities, and/or any other suitable category of investment instrument 14. After categorizing investment instruments 14 underlying the particular FSA 12, monitor server 50 may determine whether the particular FSA 12 satisfies the one or more investment guidelines 18.

If monitor server 50 determines that FSA 12 does not comply with investment guidelines 18, monitor server 50 may generate alert message 24. Alert message 24 may indicate the particular investment guideline 18 with which FSA profile 38 does not comply. In some embodiments, alert message 24 may specify a grace period 68 within which owner 26 should bring FSA 12 into compliance with investment guidelines 18. In some embodiments, alert message 24 may specify that, if FSA 12 is not brought into compliance within grace period 68, investment system 10 may terminate FSA 12 and/or cancel annuity 13 associated with FSA 12. In other embodiments, alert message 24 may specify that, if FSA 12 is not brought into compliance within grace period 68, investment system 10 may raise the fees associated with FSA 12, may reduce base amount 64 by a configurable percentage, or may impose any number and combination of suitable penalties.

Data regarding FSA profiles 38 in account memory 32 may be provided to monitor server 50 via interface 37 in account server 30. In some embodiments, interface 37 may comprise a listener module that is operable to detect trading orders 22 received from clients 20. In addition, or alternatively, the listener module in account server 30 may be operable to detect the updating of FSA profiles 38 in account memory 32. The listener module in interface 37 may be operable to transmit to monitor processor 54 detected events such as, for example, trading orders 22, updates to FSA profiles 38, and/or any suitable detected event. In other embodiments, monitor server 50 may be operable to establish a socket connection with account server 30. Via the socket connection with account server 30, monitor processor 54 may be operable to retrieve data from one or more FSA profiles 38 in account memory 32. In yet other embodiments, account server 30 may be configured to update FSA profiles 38 in account memory 32 and to periodically transmit all or portions of the updated FSA profiles 38 to monitor server 50. For example, account server 30 may be configured to update and/or transmit FSA profiles 38 to monitor server 50 at the end of each day, at the end of each hour, or according to any suitable time period.

In some embodiments, by allowing insurance center 60 to continuously monitor FSA profiles 38 stored in account server 30, investment system 10 may allow insurance center 60 to control its risk associated with FSAs 12. In other embodiments, by allowing monitor server 50 to continuously monitor FSA profiles 38 and to generate alert messages 24 upon detecting a particular FSA 12 that is in violation of investment guidelines 18, investment system 10 may help owners 26 keep FSAs 12 in compliance with investment guidelines 18.

Account server 30 may be operable to process withdrawals from FSAs 12. In particular, when owner 26 makes an initial withdrawal from FSA 12, account server 30 is operable to determine the appropriate income percentage 62 stored in FSA profile 38. As explained above, account server 30 stores in FSA profile 38 income percentages 62 in association with respective age ranges. Based at least in part on the age of owner 26 at the time of the initial withdrawal from FSA 12, account server 30 is operable to identify in FSA profile 38 a particular income percentage 62. Based at least in part on the identified income percentage 62 and base amount 64 in FSA profile 38, account server 30 may determine a maximum amount that owner 26 may withdraw during a configurable period of time. In some embodiments, the determined maximum amount may be referred to as the allowance amount 72. Allowance amount 72 generally represents the maximum amount that owner 26 is permitted to withdraw from FSA 12 during a configurable period of time. For example, allowance amount 72 may be the maximum amount that owner 26 is permitted to withdraw annually. According to certain embodiments, if owner 26 withdraws more than allowance amount 72 during the configurable period of time, account server 30 may subsequently reduce base amount 64 (causing a reduction of allowance amount 72) associated with owner 26. In some embodiments, if current value 66 of FSA 12 falls to zero, allowance amount 72 represents the value of annuity payment 16 from insurance center 60 to owner 26. In some embodiments, annuity payments 16 may be made according to any suitable interval of time (e.g., quarterly, semi-annually, annually, etc.). According to certain embodiments, current value 66 of FSA 12 may fall to zero due to owner withdrawals from FSA 12, negative market performance, and/or charges or fees associated with FSA 12. In some embodiments, allowance amount 72 may be referred to as the "Guaranteed Lifetime Amount." Account server 30 is operable to generate and store allowance amount 72 in FSA profile 38.

An example illustrates certain embodiments. Owner A opens FSA 12 at age forty-eight. FSA 12 is associated with annuity condition 58 that, if current value 66 of FSA 12 falls to zero, Owner A, for the rest of his or her life, annually receives from insurance center 60 annuity payment 16 equal to allowance amount 72. When Owner A opens FSA 12, account server 30 generates FSA profile 38 and determines income percentages 62 associated with respective age ranges. In particular, account server 30 determines a first income percentage 62 of 4.0% if Owner A makes the first withdrawal when Owner A is between ages 50 and 59. Account server 30 determines a second income percentage 62 of 5.0% if Owner A makes the first withdrawal when Owner A is between ages 60 and 69. In this example, Owner A makes the first withdrawal at age 56. At that time, base amount 64 of FSA 12 is $1,000,000. Based at least in part on age of Owner A at the time of the first withdrawal, account server 30 identifies 4.0% as the appropriate income percentage 62 for calculating allowance amount 72. In this example, account server 30 multiplies base amount 64 of $1,000,000 by identified income percentage 62 of 4.0% to determine allowance amount 72 of $40,000. Account server 30 may store in FSA profile 38 allowance amount 72 of $40,000. In this example, Owner A is guaranteed no less than $40,000 annually for the remainder of his or her life (unless FSA 12 violates investment guidelines 18 or unless owner 26 withdraws more than allowance amount 72 from FSA 12 during a given year). If current value 66 of FSA 12 falls to zero, Owner A may begin to receive, from insurance center 60, annuity payment 16 of $40,000 for the rest of his or her life.

In some embodiments, account server 30 and/or monitor server 50 may penalize owner 26 if owner 26 withdraws from FSA 12 more than allowance amount 72 during a configurable period of time. For example, if owner 26 withdraws more than allowance amount 72 during a given year, account server 30 and/or monitor server 50 may decrease base amount 64 of FSA 12. In some embodiments, as of the date of the excess withdrawal, account server 30 and/or monitor server 50 may reset base amount 64 to be equal to the lesser of 1) the base amount 64 immediately prior to the excess withdrawal less the (excess withdrawal multiplied by base amount 64 divided by current value 66 just prior to the excess withdrawal); or 2) current value 66 immediately after the excess withdrawal. After base amount 64 is reset, allowance amount 72 may be re-calculated to be equal to the current income percentage 62 multiplied by the new base amount 64 of FSA 12.

In certain embodiments, if owner 26 withdraws less than allowance amount 72 during a given year, then the portion of allowance amount 72 that is not withdrawn may, during a subsequent year, be withdrawn by owner 26 in addition to allowance amount 72 for the subsequent year. In some embodiments, if owner 26 withdraws less than allowance amount 72 in multiple years, the unused portions from each year may accumulate. Thus, by withdrawing less than allowance amount 72 during a given year, owner 26 may, according to certain embodiments, withdraw more than allowance amount 72 without penalty during a subsequent year.

In some embodiments, the benefit associated with FSA 12 may be increased or augmented if owner 26 of FSA 12 becomes functionally impaired or develops a long-term care need. In such embodiments, owner 26 may receive an increased benefit as the result of a qualifying event. The qualifying event may be that owner 26 becomes unable to perform certain activities of daily living, that owner 26 develops a long-term care need, that owner 26 becomes functionally impaired, and/or any suitable qualifying event. In certain embodiments, as a result of the qualifying event, the base amount 64 of FSA 12 associated with owner 26 is increased by a configurable amount and/or according to a suitable multiplier or formula. The increase of base amount 64 causes an increase in allowance amount 72 associated with FSA 12. In other embodiments, as a result of the qualifying event, allowance amount 72 associated with FSA 12 may be increased without modifying base amount 64. In such embodiments, allowance amount 72 may be increased by a configurable amount and/or according to a suitable multiplier or formula. In certain embodiments, the benefit associated with FSA 12 may be increased if a qualifying event occurs before or after owner 26 makes an initial withdrawal from FSA 12.

It should be understood that, at the time owner 26 opens a particular FSA 12, investment system 10 may determine one or more parameters for the annuity benefit associated with the particular FSA 12. For example, in conjunction with owner 26 opening FSA 12, insurance center 60 and/or account server 30 may determine the particular income percentages 62 that may be used in the future to determine allowance amount 72 and/or annuity payments 16 to owner 26. Accordingly, at the time owner 26 establishes a particular FSA 12, insurance center 60 may execute an insurance contract regarding annuity payments 16 associated with the particular FSA 12. In some embodiments, because insurance center 60 may execute the insurance contract for a particular FSA 12 in conjunction with owner 26 establishing the particular FSA 12, the particular FSA 12 may represent a unified asset comprising an annuity benefit as well as a bundle of investment instruments 14 selected by owner 26.

As explained above, account server 30 may be associated with an account management entity such as a bank, brokerage firm, and/or other suitable financial management entity. Monitor server 50 may be associated with an insurance entity such as, for example, an insurer, underwriter, and/or other suitable entity. In some embodiments, the account management entity that maintains and operates account server 30 may be distinct and different from the insurance entity that maintains and operates monitor server 50. In other embodiments, the account management entity and the insurance entity may be divisions or departments of the same corporation, company, or business entity. In some embodiments, monitor server 50 may be remote from account server 30. In other embodiments, monitor server 50 may be directly coupled to account server 30. In yet other embodiments, the functions and operations of monitor server 50 may be performed by account server 30. It should be understood that the functions and operations of account server 30 and/or monitor server 50 may be performed by a server pool or by computers other than servers. It should be further understood that the internal structures of account server 30 and monitor server 50 and the interfaces, modules, processors, and memory devices associated therewith are malleable and can be readily changed, modified, rearranged, or reconfigured to achieve the described functions and operations.

FIGS. 2A-2D illustrate an example FSA profile 38 associated with Owner A at various stages during the life of Owner A, according to certain embodiments. In particular, FIG. 2A illustrates the example FSA profile 38 prior to the first withdrawal of funds by Owner A. FIG. 2B illustrates the example FSA profile 38 on the date of the first withdrawal of funds by Owner A. FIG. 2C illustrates the example FSA profile 38 after the first withdrawal of funds and prior to annuity condition 58 being satisfied. FIG. 2D illustrates the example FSA profile 38 after annuity condition 58 has been satisfied.

As stated above, FIG. 2A illustrates an example FSA profile 38 prior to the first withdrawal of funds by Owner A, according to certain embodiments. The example FSA profile 38 indicates the current date—Aug. 7, 2026—and the current age of Owner A. The initial deposit amount ($100,000) and the date of the initial deposit (Dec. 2, 2006) is stored in the example FSA profile 38. In the present example, at the time Owner A opened FSA 12, account server 30 determined income percentages 62 in association with respective age ranges. The determined income percentages 62 and respective age ranges are stored in the example FSA profile 38.

In the present example, after making an initial deposit, Owner A made subsequent contributions to FSA 12. The amount and date of each contribution is stored in contribution log 78 in the example FSA profile 38. In the present example, Owner A used the contributions to purchase various investment instruments 14. The quantity, unit price, and total value of each type of investment instrument 14 purchased by Owner A is stored in instrument log 74 in the example FSA profile 38. In the present example, a particular annuity condition 58 is stored in FSA profile 38.

FSA profile 38 further comprises base amount 64 and current value 66 of FSA 12. In the present example, account server 30 is configured to re-calculate the base amount 64 of FSA 12 annually on the anniversary date of the initial deposit. Account server 30 is further configured to re-calculate base amount 64 to be equal to the greater of (1) current value 66 of the FSA 12 or (2) the prior base amount 64. In this example, FSA profile 38 stores base amount 64 of $712.002.00. The example FSA profile 38 indicates that base amount 64 was last calculated on Dec. 2, 2025. Since that time, current value 66 of FSA 12 has grown to $753,500.00. In the present example, Owner A has not yet made a first withdrawal from FSA 12.

FIG. 2B illustrates the example FSA profile 38 on the date of the first withdrawal of funds by Owner A, according to certain embodiments. In this example, Owner A makes a first withdrawal from FSA 12 on Aug. 7, 2040—fourteen years after the date of the example FSA profile 38 illustrated in FIG. 2A. In FIG. 2B, instrument log 74 in the example FSA profile 38 indicates the quantity, unit price, and total value of each type of investment instrument 14 held in FSA 12. The example FSA profile 38 indicates that base amount 64 and current value 66 of FSA 12 have increased during the past fourteen years. In particular, base amount 64 now equals $1,250,465.00. Account server 30 determines that Owner A is sixty-three years old on the date of the first withdrawal. Based on the determined age, account server 30 identifies 6.0% as the appropriate income percentage 62 for determining allowance amount 72. After identifying the appropriate income percentage 62, account server 30 multiplies income percentage 62 of 6.0% by base amount 64 of $1,250,465.00 to determine allowance amount 72 of $75,027.90.

Although the present example illustrates allowance amount 72 as the product of income percentage 62 and base amount 64, it should be understood that income percentage 62 and base amount 64 may be used according to any suitable formula to determine allowance amount 72.

FIG. 2C illustrates the example FSA profile 38 for Owner A as of Aug. 7, 2055—fifteen years after the date of the first withdrawal from FSA 12. The example FSA profile 38 comprises withdrawal log 76. Withdrawal log 76 may comprise the total withdrawal amounts for each contract year since the first withdrawal from FSA 12.

The example FSA profile 38 stores current value 66 and base amount 64 of FSA 12. In the present example, current value 66 of FSA 12 has fallen to $670,540.00 due, at least in part, to withdrawals from FSA 12 by Owner A. Base amount 64 of FSA 12, which was re-calculated on the last anniversary of the initial deposit, is still $1,250,465.00. As explained above, account server 30 in the present example is configured to re-calculate base amount 64 to be equal to the greater of (1) the current value 66 of the FSA 12 or (2) the prior guaranteed base amount 64. Thus, although current value 66 of FSA 12 has decreased, base amount 64 of FSA 12 has not decreased.

FIG. 2D illustrates the example FSA profile 38 for Owner A after annuity payments 16 have begun. In particular, Owner A's withdrawal of $24,625.00 in contract year 2065 caused current value 66 of FSA 12 to fall to zero. Consequently, account server 30 and/or monitor server 50 detected that annuity condition 58 in FSA profile 38 had been satisfied. At that time, account server 30 and/or monitor server 50 notified insurance center 60 to commence annuity payments 16 to Owner A. Because Owner A had already received $24,625.00 from FSA 12 in contract year 2065, the annuity payment 16 for that year was $50,402.90 (i.e., balance of allowance amount 72). The following year, the annuity payment 16 from insurance center 60 was for $75,027.90 (i.e., the full allowance amount 72). In some embodiments, monitor server 50 is operable to transmit annuity payments 16 directly to client 20 associated with owner 26. In other embodiments, monitor server 50 is operable to forward to insurance center 60 a command to initiate annuity payments 16. Insurance center 60 may then transmit annuity payments 16 to owner 26.

Thus, in some embodiments, FSA 12 represents an account that provides a guaranteed income stream. Even if current value 66 of FSA 12 falls to zero prior to death of owner 26, owner 26 may continue to annually receive allowance amount 72. Thus, owner 26 may have the assurance of a guaranteed income stream regardless of how long owner 26 lives or regardless of how the market performs.

In the embodiments illustrated by the foregoing example, account server 30 was configured to annually re-calculate base amount 64 to be equal to the greater of (1) current value 66 of the FSA 12 or (2) the prior base amount 64. In other embodiments, if investment performance of FSA 12 during a given year is less than a configurable rollup percentage, then on the anniversary date, account server 30 may be configured to increase base amount 64 of FSA 12 by the rollup percentage. In particular, account server 30 may be configured to re-calculate base amount 64 of FSA 12 annually by setting base amount 64 equal to the greater of (1) current value 66 of FSA 12 or (2) the product of the prior year's base amount 64 increased by the rollup percentage. In some embodiments, the rollup percentage may serve as an incentive for owner 26 to delay making an initial withdrawal from FSA 12.

To control risk associated with guaranteeing an income stream, investment system 10 may provide investment guidelines 18 as a condition of the annuity benefit of FSA 12. In particular, investment system 10 may require owner 26 associated with FSA 12 to follow investment guidelines 18 in purchasing, selling, trading, and/or managing investment instruments 14 underlying FSA 12. In some embodiments, investment guidelines 18 may provide thresholds for one or more categories of investment instruments 14. For example, investment guidelines 18 may specify that a particular category of investment instrument 14 may not make up more than a configurable percentage of current value 66 of FSA 12. As another example, investment guidelines 18 may specify that, for a particular FSA 12, the ratio of a first category of investment instrument 14 to a second category of investment instrument 14 must be within a configurable range. According to certain embodiments, investment guidelines 18 may specify concentration criteria for investment instruments 14 in FSA 12. For example, investment guidelines 18 may specify that the number of different investment instruments 14 in FSA 12 must be more or less than a configurable threshold. It should be understood that investment guidelines 18 may comprise any number and combination of thresholds, rules, standards, limitations, or other suitable guidelines regarding the purchase, sale, or management of investment instruments 14.

Investment system 10 is operable to monitor, in real-time, the compliance of FSAs 12 with investment guidelines 18. In particular, account server 30 is operable to disclose FSA profiles 38 to monitor server 50 via network 70. In some embodiments, account server 30 is operable to transmit FSA profiles 38 to monitor server 50 via interface 37 in account server 30 and/or monitor server 50. Interface 37 may comprise a network portal, socket, listener module, and/or any hardware and/or software suitable to facilitate communication of data between account server 30 and monitor server 50.

Upon receiving FSA profiles 38 from account server 30, monitor server 50 is operable analyze data in FSA profiles 38 to determine whether the particular FSAs 12 associated with FSA profiles 38 comply with investment guidelines 18. The analysis of data in a particular FSA profile 38 may comprise calculating prices and quantities of particular investment instrument(s) 14. In some embodiments, the analysis of data in a particular FSA profile 38 associated with a particular FSA 12 may comprise determining one or more quality ratings associated with one or more investment instruments 14 underlying the particular FSA 12. According to certain embodiments, the analysis of data in FSA profile 38 may comprise calculating percentages and asset allocations associated with investment instruments 14 underlying FSA 12.

In some embodiments, the analysis may comprise categorizing investment instruments 14 underlying FSA 12. In particular, monitor server 50 may calculate the quantity, value, and/or amount of investment instruments 14 in each category associated with FSA 12. Monitor server 50 may calculate a ratio of the value and/or amount of investment instruments 14 in a first category against the value and/or amount of investment instruments 14 in a second and/or third category. Based at least in part on the analysis of data in FSA profile 38, monitor server 50 is operable to determine whether FSA 12 complies with investment guidelines 18.

In some embodiments, if monitor server 50 determines that a particular FSA 12 does not comply with investment guidelines 18, monitor server 50 is operable to generate alert message 24. Alert message 24 may comprise information regarding the particular investment guideline(s) 18 that are not satisfied by FSA 12. In some embodiments, alert message 24 may comprise instructions for bringing FSA 12 into compliance with investment guidelines 18. For example, if monitor server 50 determines that FSA 12 does not comply with a particular investment guideline 18 that prohibits FSA 12 from holding more than a particular quantity of a particular investment instrument 14, monitor server 50 may generate alert message 24 that instructs owner 26 to sell or offer up the excess quantity of the particular investment instrument 14. In some embodiments, monitor server 50 may determine a configurable grace period 68 for allowing owner 26 and/or broker to bring FSA 12 into compliance with investment guidelines 18. Monitor server 50 may further determine a consequence or penalty for not bringing FSA 12 into compliance with investment guidelines 18. For example, monitor server 50 may determine that, if FSA 12 is not brought into compliance within one week of the alert message 24, then annuity benefit associated with FSA 12 will be canceled. As another example, monitor server 50 may determine that, if FSA 12 is not brought into compliance within one week of the alert message 24, then base amount 64, allowance amount 72, and/or income percentage 62 will be reduced. It should be understood that monitor server 50 may determine grace period 68 of one week, one month, or any other suitable time period. It should be further understood that monitor server 50 may determine any suitable penalty for non-compliance with investment guidelines 18 subject to contractual limitations. Alert message 24 may be configured to comprise information regarding the determined grace period 68 and regarding the consequence of not bringing FSA 12 into compliance within the determined grace period 68.

In the foregoing example, Owner A was thirty years old at the time of establishing FSA 12. Owner A did not make an initial withdrawal from FSA 12 until over thirty-three years after establishing FSA 12. In other embodiments, owner 26 may be older or younger upon establishing FSA 12 and/or upon making an initial withdrawal. For example, owner 26 may establish FSA 12 at the age of sixty and may make an initial withdrawal five years later. It should be understood that owner 26 may establish FSA 12 at any suitable age.

Figure 3:
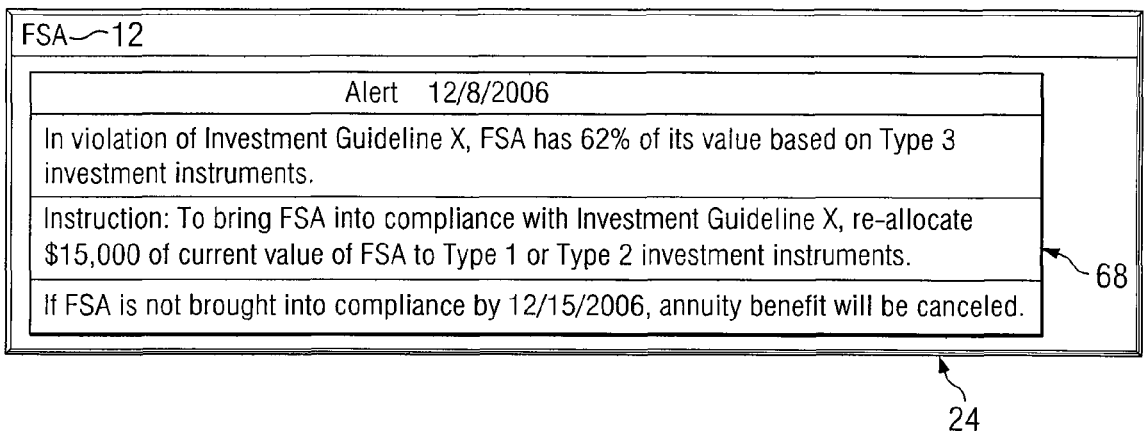
FIG. 3 illustrates an alert message according to certain embodiments of the present invention.

FIG. 3 illustrates an example alert message 24, according to certain embodiments. In the present example, monitor server 50 receives FSA profile 38 from account server 30. Monitor server 50 then analyzes data in the received FSA profile 38 to determine whether FSA 12 associated with the received FSA profile 38 complies with investment guidelines 18. In the present example, monitor server 50 determines that FSA 12 is in violation of Investment Guideline X. In particular, monitor server 50 determines that the percentage of FSA 12 that is based on Type 3 investment instruments 14 is above a particular threshold. Upon identifying the violation, monitor server 50 determines instructions for bringing FSA 12 into compliance with investment guidelines 18. In the present example, monitor server 50 determines that $15,000.00 of current value 66 of FSA 12 should be re-allocated to Type 1 or Type 2 investment instruments 14. Monitor server 50 then determines grace period 68 and a penalty if FSA 12 is not brought into compliance within grace period 68. In the present example, monitor server 50 determines that annuity benefit will be cancelled if FSA 12 is not brought into compliance within seven days of alert message 24.

In the foregoing examples, FSA profile 38 is associated with a single owner 26. It should be understood, however, that a particular FSA 12 may have more than one owner 26. In particular, spouses may be joint owners 26 of FSA 12. In some embodiments, at the time of the first withdrawal from FSA 12 associated with spouses as joint owners 26, account server 30 may be configured to identify the appropriate income percentage 62 based on the age of the younger spouse. In other embodiments, account server 30 may be configured to identify the appropriate income percentage 62 based on the age of the older spouse, based on the average age of the spouses, or based on any other suitable criteria.

It should be further understood that FSA 12 may be associated with a non-natural owner 26 such as, for example, a trust. In some embodiments, when FSA 12 is owned by a trust, a particular individual may be designated as a beneficiary of FSA 12. The beneficiary of FSA 12 may be referred to as a beneficial owner 26 of FSA 12. In some embodiments, account server 30 is operable to identify the appropriate income percentage 62 based at least in part on the age of the beneficial owner 26 at the time of the first withdrawal from FSA 12.

In the foregoing examples, annuity payments 16 were triggered when current value 66 of FSA 12 fell to zero. In some embodiments, however, investment system 10 may allow owner 26 of FSA 12 to use the assets of FSA 12 to purchase an immediate annuity. According to certain embodiments, investment system 10 may require owner 26 to wait for a configurable period of time (e.g., one year, two years, or other suitable period) after establishing FSA 12 before owner 26 may convert the assets of FSA 12 into an immediate annuity. In some embodiments, if owner 26 elects to convert FSA 12 into an immediate annuity, investment system may require owner 26 to convert the entire FSA 12 into the immediate annuity.

As explained above, one or more investment guidelines 18 may be associated with a particular class of investment instrument 14. Accordingly, to determine whether FSA 12 complies with investment guidelines 18, monitor server 50 may categorize investment instruments 14 underlying FSA 12. In some embodiments, monitor server 50 may determine that a particular investment instrument 14 in FSA profile 38 does not fall into one or more prescribed categories. Accordingly, investment system 10 may comprise a particular investment guideline 18 that specifies that FSA profile 38 may not comprise more than a configurable percentage, value, or quantity of investment instruments 14 that do not fall into one or more of the prescribed categories. If a particular FSA profile 38 comprises more than a configurable threshold of investment instruments 14 that do not fall into a prescribed category, monitor server 50 may generate alert message 24 indicating that FSA profile 38 does not satisfy investment guidelines 18.

In some embodiments, the entity that maintains and/or operates account server 30 may charge owner 26 a fee to maintain FSA 12 in investment system 10. Account server 30 may determine the fee amount for a particular owner 26 based at least in part on base amount 64 of FSA 12 of the particular owner 26. For example, for a particular FSA 12, account server 30 may determine the fee amount by multiplying base amount 64 of the particular FSA 12 by a configurable percentage. Thus, a change in base amount 64 of FSA 12 may cause a change in the fee charged to owner 26 of FSA 12. Although the foregoing example illustrates a fee based at least in part on base amount 64 of FSA 12, it should be understood that account server 30 may determine the fee for a particular FSA 12 according to any suitable criteria.

In some embodiments, account server 30 and/or monitor server 50 may collect the fee from owner 26 monthly, quarterly, annually, or according to any suitable time period. In some embodiments, account server 30 may be configured to collect the fee from a particular owner 26 by debiting FSA 12 of the particular owner 26. In other embodiments, account server 30 may be configured to collect the fee from an account other than FSA 12. In certain embodiments, if the fee is collected by debiting FSA 12, then the fee may be considered a withdrawal from FSA 12. According to certain embodiments, if current value 66 of FSA 12 falls to zero, investment system 10 may cease to charge owner 26 the fee associated with FSA 12.

As explained above, current value 66 of FSA 12 may change due to investment performance, contributions, and/or withdrawals. In some embodiments, if investment performance associated with FSA 12 is less than a configurable rollup percentage (e.g., 4%, 5%, or other suitable percentage), then account server 30 may be configured to increase base amount 64 of FSA 12 by the rollup percentage. (e.g., 4%, 5%, or other suitable percentage). In some embodiments, investment system 10 may periodically (e.g., monthly, quarterly, annually, etc.) adjust base amount 64 of FSA 12 (e.g., due to investment performance, the rollup percentage, contributions, etc.) until owner 26 makes an initial withdrawal from FSA 12. According to certain embodiments, investment system 10 may, after the initial withdrawal from FSA 12, cease to apply the rollup percentage to adjust base amount 64. Thus, investment system 10 may provide incentives for owner 26 to delay the initial withdrawal from FSA 12.

In some embodiments, account server 30 may be configured to adjust income percentages 62 associated with FSA 12 upon the occurrence of one or more events. For example, account server 30 may be configured to increase or decrease income percentage 62 associated with FSA 12 if the performance of investment instruments 14 in FSA 12 satisfies a configurable threshold. As another example, account server 30 may be configured to increase or decrease income percentage 62 associated with FSA 12 upon the death of a spouse, upon a change in ownership of FSA 12, and/or in response to any suitable event.

Figure 4:
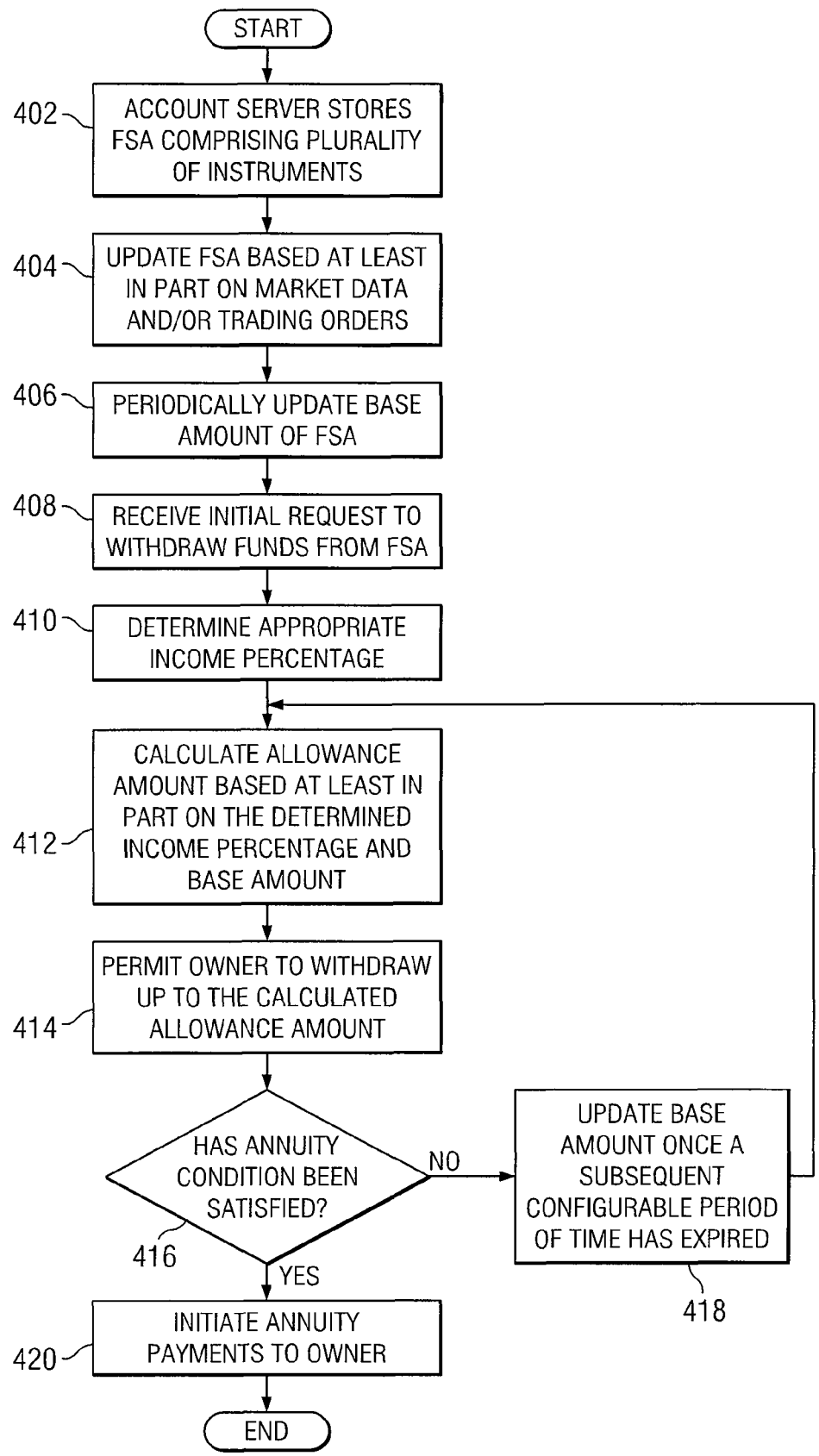
FIG. 4 illustrates a flow chart for determining an allowance amount associated with a financial services account according to certain embodiments of the present invention.

FIG. 4 illustrates a flowchart for determining allowance amount 72 associated with FSA 12, according to certain embodiments. The method begins at step 402 by account server 30 storing FSA 12 associated with owner 26. Account server 30 is operable to determine current value 66 of FSA 12 based at least in part on a plurality of investment instruments 14 underlying FSA 12. At step 404, account server 30 is operable to update FSA 12 based at least in part on market data from market centers 40 and/or on one or more trading orders 22 from owner 26. At step 406, account server 30 is operable to periodically update base amount 64 of FSA 12. In some embodiments, account server 30 may periodically update base amount 64 of FSA 12 to be the greater of (1) current value 66 of FSA 12 or (2) the prior base amount 64. At step 408, account server 30 is operable to receive from owner 26 an initial request to withdraw funds from FSA 12.

In conjunction with receiving the initial request to withdraw funds, account server 30 is operable to determine a particular income percentage 62 at step 410. In some embodiments, account server 30 is operable to determine the particular income percentage 62 based at least in part on the age of owner 26 at the time of the initial request to withdraw funds. At step 412, account server 30 is operable to calculate allowance amount 72 based at least in part on the determined income percentage 62 and base amount 64. In some embodiments, allowance amount 72 may be calculated by multiplying the determined income percentage 62 by base amount 64. At step 414, account server 30 may permit owner 26 to, within a configurable period of time, withdraw from FSA 12 up to the calculated allowance amount 72. For example, account server 30 may permit owner 26 to annually withdraw from FSA 12 up to the calculated allowance amount 72. At step 416, account server 30 determines whether annuity condition 58 associated with FSA 12 has been satisfied. In some embodiments, annuity condition 58 may be to trigger annuity payments 16 to owner 26 if current value 66 of FSA 12 falls to zero. If account server 30 determines at step 416 that annuity condition 58 has not been satisfied, then at step 418, account server 30 updates base amount 64 once a second configurable period of time has expired. The method then returns 412. If, however, account server 30 determines at step 416 that annuity condition 58 has been satisfied, then at step 420, account server 30 is operable to initiate annuity payments 16 to owner 26 such that the initiated annuity payments 16 continue for the life of owner 26. The method then ends.

Figure 5:
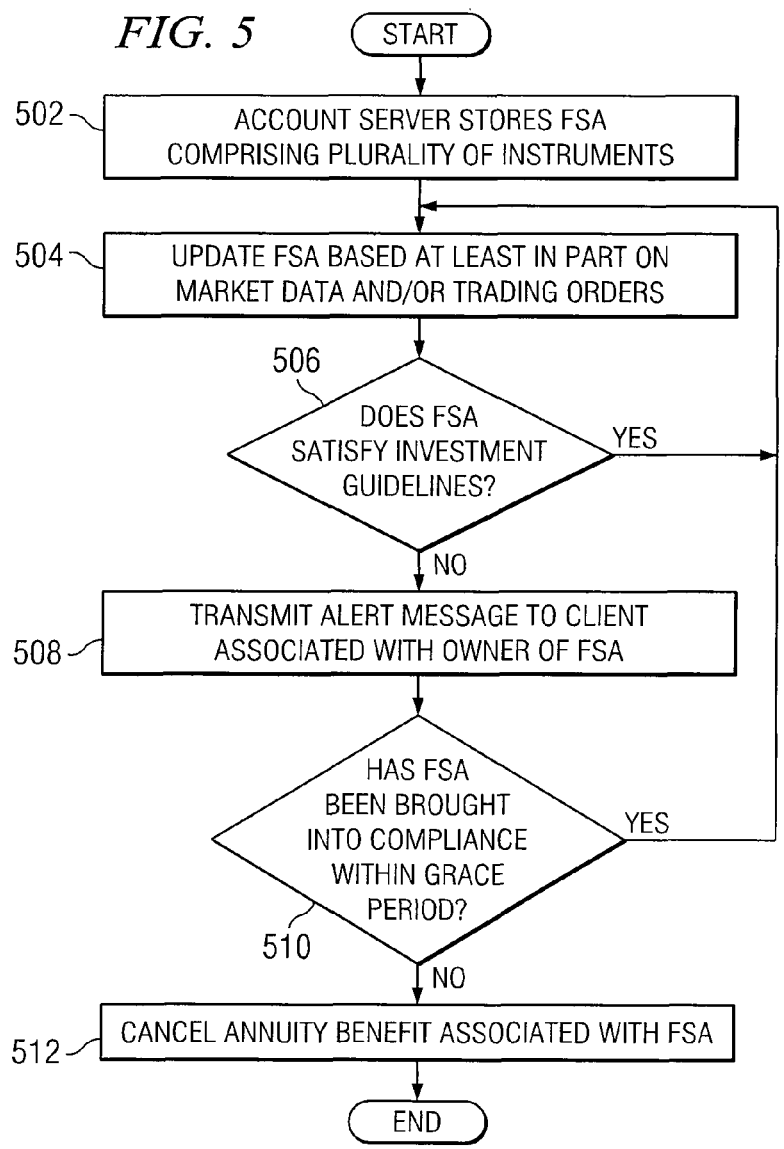
FIG. 5 illustrates a flow chart for monitoring a financial services account for compliance with investment guidelines according to certain embodiments of the present invention.

FIG. 5 illustrates a method for monitoring FSA 12 for compliance with investment guidelines 18. The method begins at step 502 by account server 30 storing FSA 12 associated with owner 26. Account server 30 is operable to determine current value 66 of FSA 12 based at least in part on a plurality of investment instruments 14 underlying FSA 12. At step 504, account server 30 is operable to update FSA 12 based at least in part on market data from market centers 40 and/or on one or more trading orders 22 from owner 26. At step 506, monitor server 50 uses account data associated with FSA 12 to determine whether the plurality of investment instruments 14 in FSA 12 satisfy investment guidelines 18. If, at step 506, monitor server 50 determines that the plurality of investment instruments 14 in FSA 12 satisfy investment guidelines 18, then the method returns to step 504. If, however, at step 506 monitor server 50 determines that the plurality of investment instruments 14 in FSA 12 do not satisfy investment guidelines 18, then monitor server 50, at step 508, transmits alert message 24 to client 20 associated with owner 26. Alert message 24 may indicate the particular guideline with which FSA 12 does not comply. In some embodiments, alert message 24 may specify a grace period 68 within which owner 26 should bring FSA 12 into compliance with investment guidelines 18. At step 510, monitor server 50 determines whether FSA 12 has been brought into compliance with investment guidelines 18 within grace period 68. If, at step 510, monitor server 50 determines that FSA 12 has been brought into compliance with investment guidelines 18 within grace period 68, then the method returns to step 504. If, however, at step 510 monitor server 50 determines that FSA 12 has not been brought into compliance within grace period 68, then at step 512, monitor server 50 cancels annuity benefit associated with FSA 12. In some embodiments, if monitor server 50 determines that FSA 12 has not been brought into compliance within grace period 68, then base amount 64 may be reduced, income percentage 62 may be reduced, and/or any other suitable penalty may be imposed. The method then ends.

Although the present invention has been described in detail, it should be understood the various changes, substitutions, and alterations can be made hereto without departing from the scope of the invention as defined by the appended claims.

What is claimed is:

1. A method, comprising:
    storing in a memory an account associated with an owner, wherein the account:
        comprises a plurality of instrument selected by the owner;
        is associated with a current value based at least in part on the plurality of instruments; and
        is associated with a base amount that is periodically adjusted to be greater of the current value or the base amount prior to the adjustment; and
        is associated with a plurality of income percentages, each of the plurality of income percentages being associated with a respective age range, wherein the income percentages represent a percentage of withdrawals from the account;
    updating, by a server computer comprising a processor and memory, the account based at least in part on one or more trading orders associated with the owner;
    monitoring, by the server computer, the account to determine whether the plurality of instruments selected by the owner satisfy one or more investment guidelines associated with the annuity benefit, the one or more investment guidelines regarding at least one of purchasing, selling, trading, and management of the plurality of instruments of the account;
    providing an interface operable to permit the owner to submit a request to withdraw funds from the account;
    identifying by the server computer, one of the plurality of income percentages based at least in part on current age of the owner;
    determining by the server computer, an allowance amount by multiplying the base amount by the identified income percentage;
    permitting one or more withdrawals of the allowance amount from the account, wherein a withdrawal that causes the current value of the account to fall to zero triggers one or more annuity payments based at least in part on the allowance amount;
    determining, by the server computer on an anniversary date of the creation of the account, an investment performance of the account for the year prior to the anniversary date; and
    determining, by the server computer on the anniversary date of the creation of the account, that the owner has not made an initial withdrawal from the account, and in response:
        if the determined investment performance of the account during the year prior to the anniversary date is less than a configurable rollup percentage, increasing the base amount by the configurable rollup percentage; and
        if the determined investment performance of the account during the year prior to the anniversary date is not less than the configurable rollup percentage, setting the base amount to be the product of the prior year's base amount and the rollup percentage.

2. The method of claim 1, further comprising, if the plurality of instruments in the account do not satisfy the one or more investment guidelines, transmitting an alert message to a client device associated with the owner.

3. The method of claim 2, further comprising canceling any annuity benefit associated with the account if the account is not brought into compliance with the one or more investment guidelines within a configurable period of time after transmitting the alert message.

4. The method of claim 2, further comprising reducing any annuity benefit associated with the account if the account is not brought into compliance with the one or more investment guidelines within a configurable period of time after transmitting the alert message.

5. The method of claim 2, wherein the alert message comprises:
    an indication of a particular one of the one or more investment guidelines not satisfied by the plurality of instruments; and
    an amount of time in which the plurality of instruments should be brought into compliance with the particular one of the one or more investment guidelines.

6. The method of claim 1, wherein:
    the one or more investment guidelines comprise a quality threshold; and the determination of whether the plurality of instruments satisfy the one or more investment guidelines comprises determining whether the plurality of instruments in the account satisfy the quality threshold.

7. The method of claim 1, wherein: the one or more investment guidelines prescribe an asset allocation; and the determination of whether the plurality of instruments satisfy the one or more investment guidelines comprises determining whether the plurality of instruments in the account satisfy the prescribed asset allocation.

8. The method of claim 1, wherein:
    the one or more investment guidelines comprise:
        a first threshold associated with a first category of instruments; and
        a second threshold associated with a second category of instruments; monitoring the account comprises identifying in the account a first set of instruments that correspond to the first category and a second set of instruments that correspond to the second category; and
        the determination of whether the plurality of instruments satisfy the one or more investment guidelines comprises:
        determining whether the first set of installments satisfy the first threshold; and
    determining whether the second set of instruments satisfy the second threshold.

9. The method of claim 1, wherein:
    the allowance amount represents a maximum withdrawal amount per year; and further comprising:
    if more than the allowance amount is withdrawn from the account during a year, reducing the allowance amount.

10. The method of claim 1, wherein the one or more annuity payments continue until the death of the owner.

11. A system, comprising:
a memory operable to store an account associated with an owner, wherein the account:
comprises a plurality of instruments selected by the owner;
is associated with a current value based at least in part on the plurality of instruments;
is associated with a base amount that is periodically adjusted to be greater of:
the current value; or
the base amount prior to the adjustment; and
is associated with a plurality of income percentages, each of the plurality of income percentages being associated with a respective age range, wherein the income percentages represent a percentage of withdrawals from the account;
and a processor communicatively coupled to the memory and operable to:
update the account based at least in part on one or more trading orders associated with the owner;
monitor the account to determine whether the plurality of instruments selected by the owner satisfy one or more investment guidelines associated with the annuity benefit, the one or more investment guidelines regarding at least one of purchasing, selling, trading, and management of the plurality of instruments of the account;
provide an interface operable to permit the owner to submit a request to withdraw funds from the account;
identify one of the plurality of income percentages based at least in part on current age of the owner;
determine an allowance amount by multiplying the base amount by the identified income percentage;
permit one or more withdrawals of the allowance amount from the account, wherein a withdrawal that causes the current value of the account to fall to zero triggers one or more annuity payments based at least in part on the allowance amount;
determine, on an anniversary date of the creation of the account, an investment performance of the account for the year prior to the anniversary date; and
determine, on the anniversary date of the creation of the account, that the owner has not made an initial withdrawal from the account, and in response:
if the determined investment performance of the account during the year prior to the anniversary date is less than a configurable rollup percentage, increase the base amount by the configurable rollup percentage; and
if the determined investment performance of the account during the year prior to the anniversary date is not less than the configurable rollup percentage, setting the base amount to be the product of the prior year's base amount and the rollup percentage.

12. The system of claim 11, wherein, if the plurality of instruments in the account do not satisfy the one or more investment guidelines, the processor is further operable to transmit an alert message to a client device associated with the owner.

13. The system of claim 12, wherein the processor is further operable to cancel any annuity benefit associated with the account if the account is not brought into compliance with the one or more investment guidelines within a configurable period of time after transmitting the alert message.

14. The system of claim 12, wherein the processor is further operable to reduce any annuity benefit associated with the account if the account is not brought into compliance with the one or more investment guidelines within a configurable period of time after transmitting the alert message.

15. The system of claim 11, wherein:
the one or more investment guidelines comprise a quality threshold; and the determination of whether the plurality of instruments satisfy the one or more investment guidelines comprises determining whether the plurality of instruments in the account satisfy the quality threshold.

16. The system of claim 11, wherein: the one or more investment guidelines prescribe an asset allocation; and the determination of whether the plurality of instruments satisfy the one or more investment guidelines comprises determining whether the plurality of instruments in the account satisfy the prescribed asset allocation.

17. The system of claim 11, wherein:
the one or more investment guidelines comprise:
a first threshold associated with a first category of instruments; and
a second threshold associated with a second category of instruments;
monitoring the account comprises identifying in the account a first set of instruments that correspond to the first category and a second set of instruments that correspond to the second category; and
the determination of whether the plurality of instruments satisfy the one or more investment guidelines comprises:
determining whether the first set of instruments satisfy the first threshold; and
determining whether the second set of instruments satisfy the second threshold.

18. The system of claim 11, wherein:
the allowance amount represents a maximum withdrawal amount per year; and
the processor is further operable to reduce the allowance amount if more than the allowance amount is withdrawn from the account during a year.

19. The system of claim 11, wherein the one or more annuity payments continue until the death of the owner.

20. One or more computer-readable non-transitory storage media storing software that is operable when executed by one or more computer systems to perform functions:
storing in a memory an account associated with an owner, wherein:
the account comprises a plurality of instrument selected by the owner;
the account is associated with a current value based at least in part on the plurality of instruments;
the account is associated with a base amount that is periodically adjusted to be greater of the current value or the base amount prior to the adjustment;
the account is associated with an annuity benefit that is triggered if a withdrawal causes the current value of the account to fall to zero; and
the account is associated with a plurality of income percentages, each of the plurality of income percentages being associated with a respective age range, wherein the income percentages represent a percentage of withdrawals from the account;
updating the account based at least in part on one or more trading orders associated with the owner, the account updated by a processor;
monitoring the account to determine whether the plurality of instruments selected by the owner satisfy one or more investment guidelines associated with the annuity benefit, the one or more investment guidelines regarding at least one of purchasing, selling, trading, and management of the plurality of instruments of the account;

providing an interface operable to permit the owner to submit a request to withdraw funds from the account;
identifying one of the plurality of income percentages based at least in part on current age of the owner;
if the account does not satisfy the one or more investment guidelines, transmitting an alert message to a client device associated with the owner;
determining an allowance amount by multiplying the base amount by the identified income percentage;
permitting one or more withdrawals of the allowance amount from the account, wherein a withdrawal that causes the current value of the account to fall to zero triggers one or more annuity payments based at least in part on the allowance amount;
determining, on an anniversary date of the creation of the account, an investment performance of the account for the year prior to the anniversary date; and
determining, on the anniversary date of the creation of the account, that the owner has not made an initial withdrawal from the account, and in response:
if the determined investment performance of the account during the year prior to the anniversary date is less than a configurable rollup percentage, increasing the base amount of the account by the configurable rollup percentage; and
if the determined investment performance of the account during the year prior to the anniversary date is not less than the configurable rollup percentage, setting the base amount to be the product of the prior year's base amount and the rollup percentage.

21. The media of claim 20, the functions further comprising canceling the annuity benefit associated with the account if the account is not brought into compliance with the one or more investment guidelines within a configurable period of time after the transmission of the alert message.

22. The media of claim 20, the functions further comprising reducing the annuity benefit associated with the account if the account is not brought into compliance with the one or more investment guidelines within a configurable period of time after the transmission of the alert message.

23. The media of claim 20, wherein: the one or more investment guidelines comprise a quality threshold; and the determination of whether the plurality of instruments satisfy, the one or more investment guidelines comprises determining whether the plurality of instruments in the account satisfy the quality threshold.

24. The media of claim 20, wherein: the one or more investment guidelines prescribe an asset allocation; and the determination of whether the plurality of instruments satisfy the one or more investment guidelines comprises determining whether the plurality of instruments in the account satisfy the prescribed asset allocation.

25. The media of claim 20, wherein:
the one or more investment guidelines comprise:
a first threshold associated with a first category of instruments; and
a second threshold associated with a second category of instruments; monitoring the account comprises identifying in the account a first set of instruments that correspond to the first category and a second set of instruments that correspond to the second category; and
the determination of whether the plurality of instruments satisfy the one or more investment guidelines comprises:
determining whether the first set of instruments satisfy the first threshold; and
determining whether the second set of instruments satisfy the second threshold.

26. The media of claim 20, wherein:
the allowance amount represents a maximum withdrawal amount per year; and further comprising:
if more than the allowance amount is withdrawn from the account during a year, reducing the allowance amount.

27. The media of claim 20, wherein the one or more annuity payments continue until the death of the owner.

28. A system, comprising:
an account server operable to:
store an account associated with an owner, wherein:
the account comprises a plurality of instruments selected by the owner;
the account is associated with a current value based at least in part on the plurality of instruments;
the account is associated with a base amount that is periodically adjusted to be greater of the current value or the base amount prior to the adjustment;
the account is associated with an annuity benefit that is triggered if a withdrawal causes the current value of the account to fall to zero; and
the account is associated with a plurality of income percentages, each of the plurality of income percentages being associated with a respective age range, wherein the income percentages represent a percentage of withdrawals from the account; and
update the account based at least in part on one or more trading orders associated with the owner; and
a monitor server communicatively coupled to the account server over a network, the monitor server operable to:
retrieve data regarding the account from the account server;
determine whether the plurality of instruments selected by the owner satisfy one or more investment guidelines associated with the annuity benefit, the determination based at least in part on the retrieved data, the one or more investment guidelines regarding at least one of purchasing, selling, trading, and management of the plurality of instruments of the account;
provide an interface operable to permit the owner to submit a request to withdraw funds from the account;
identify one of the plurality of income percentages based at least in part on current age of the owner;
if the account does not satisfy the one or more investment guidelines, transmitting an alert message to a client device associated with the owner;
determine an allowance amount by multiplying the base amount by the identified income percentage;
permit one or more withdrawals of the allowance amount from the account, wherein a withdrawal that causes the current value of the account to fall to zero triggers one or more annuity payments based at least in part on the allowance amount;
determine, on an anniversary date of the creation of the account, an investment performance of the account for the year prior to the anniversary date; and
determine, on the anniversary date of the creation of the account, that the owner has not made an initial withdrawal from the account, and in response:
if the determined investment performance of the account during the year prior to the anniversary date is less than a configurable rollup percentage, increase the base amount of the account by the configurable rollup percentage; and if the determined investment performance of the account during the year prior to the anniversary date is not less than the configurable rollup percentage, setting the base amount to be the product of the prior year's base amount and the rollup percentage.

29. The system of claim 28, wherein the monitor server is operable to cancel the annuity benefit associated with the account if the account is not brought into compliance with the one or more investment guidelines within a configurable period of time after the transmission of the alert message.

30. The system of claim 28, wherein the monitor server is operable to reduce the annuity benefit associated with the account if the account, is not brought into compliance with the one or more investment guidelines within a configurable period of time after the transmission of the alert message.

31. The system of claim 28, wherein: the one or more investment guidelines comprise a quality threshold; and the determination of whether the plurality of instruments satisfy the one or more investment guidelines comprises determining whether the plurality of instruments in the account satisfy the quality threshold.

32. The system of claim 28, wherein: the one or more investment guidelines prescribe an asset allocation; and the determination of whether the plurality of instruments satisfy the one or more investment guidelines comprises determining whether the plurality of instruments in the account satisfy, the prescribed asset allocation.

33. The method of claim 28, wherein:
the one or more investment guidelines comprise:
    a first threshold associated with a first category of instruments; and
    a second threshold associated with a second category of instruments;
and
    the determination of whether the plurality of instruments satisfy the one or more investment guidelines comprises:
    identifying in the account a first set of instruments that correspond to the first category and a second set of instruments that correspond to the second category;
determining whether the first set of instruments satisfy the first threshold; and
determining whether the second set of instruments satisfy the second threshold.

34. The system of claim 28, wherein:
the allowance amount represents a maximum withdrawal amount per year; and
the account server is further operable to, if more than the allowance amount is withdrawn from the account during a year, reduce the allowance amount.

35. The system of claim 28, wherein the one or more annuity payments continue until the death of the owner.

* * * * *